Jan. 2, 1945.  J. I. ELLERSTEIN  2,366,245
HATPIN
Filed May 18, 1943
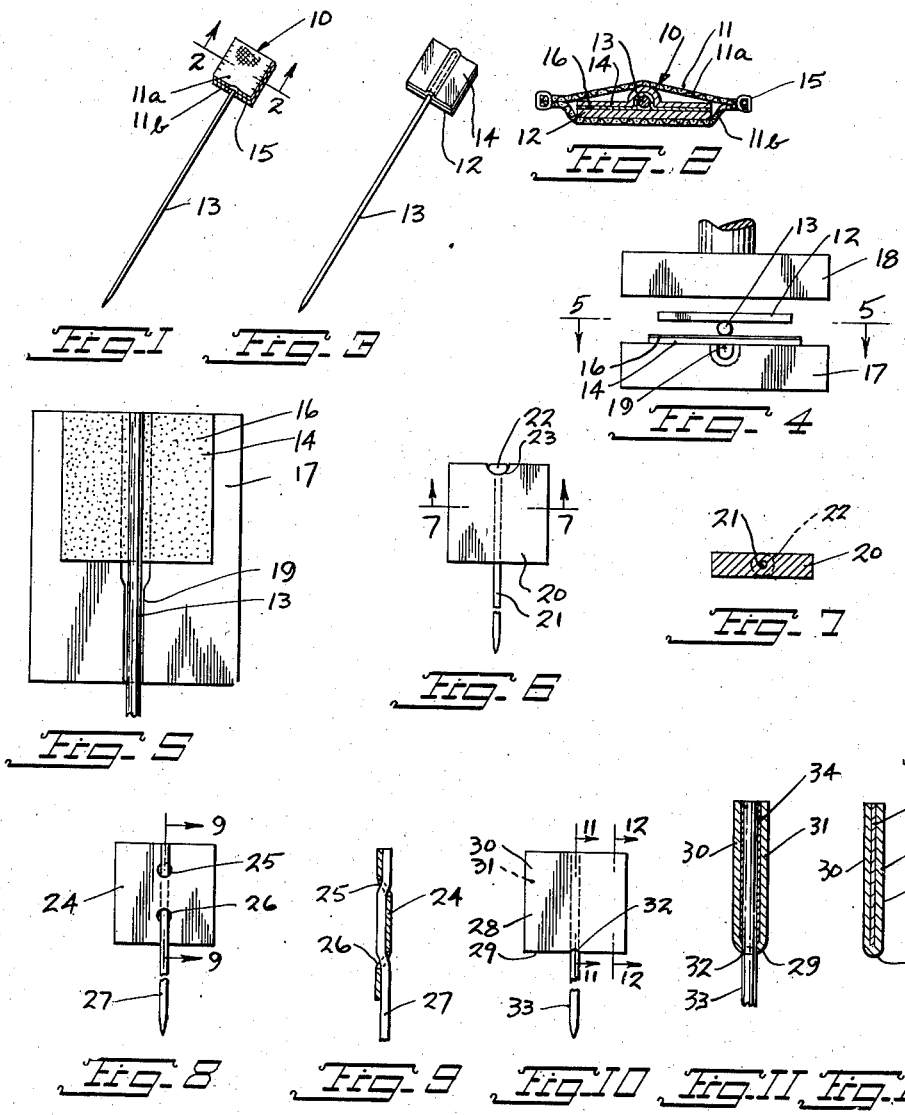
INVENTOR.
JACK I. ELLERSTEIN
BY
ATTORNEY.

Patented Jan. 2, 1945

2,366,245

UNITED STATES PATENT OFFICE 2,366,245

HATPIN

Jack I. Ellerstein, New York, N. Y.

Application May 18, 1943, Serial No. 487,427

8 Claims. (Cl. 24—150)

This invention relates to new and useful improvements in hat pins and the like, and more specifically, relates to improvements in my Patent No. 2,308,000 granted on January 12, 1943.

It is an object of this invention to improve the construction for connecting the flat rigid member with the pin shank.

Numerous improved forms for constructing the connection mentioned above are proposed. An important feature of the new construction resides in the fact that the flat rigid member is connected with the pin shank without the use of a metal staple or similar fastening element. Use is made of a support sheet and adhesive material.

Another object of the invention is the construction of an article as mentioned which is simple and durable and which may be manufactured and sold at a low cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a hat pin constructed in accordance with this invention.

Fig. 2 is an enlarged sectional view taken on the line 2—2 of Fig. 1.

Fig. 3 is a perspective view of the rigid flat member mounted on the pin shank in accordance with this invention.

Fig. 4 is an elevational view of a die for facilitating the connection between the flat rigid member and pin shank.

Fig. 5 is a horizontal view taken on the line 5—5 of Fig. 4.

Fig. 6 is a fragmentary elevational view of a connected flat rigid member and pin shank constructed in accordance with a modified form of this invention.

Fig. 7 is a sectional view taken on the line 7—7 of Fig. 6.

Fig. 8 is a fragmentary elevational view of another connected flat rigid member and pin shank constructed in accordance with still another form of this invention.

Fig. 9 is a fragmentary sectional view taken on the line 9—9 of Fig. 8.

Fig. 10 is another elevational view of a connected flat rigid member and pin shank embodying another form of this invention.

Fig. 11 is a fragmentary enlarged sectional view taken on the line 11—11 of Fig. 10.

Fig. 12 is a sectional view taken on the line 12—12 of Fig. 10.

In the form of the invention illustrated in Figs. 1 to 3, the hat pin has a head 10 which includes a cloth casing 11 and a flat rigid member 12 within and supporting said casing 10. A pin shank 13 has its rear end portion extending into the casing 11 and along one face of said flat rigid member 12. A support sheet 14 extends across and is adhesively connected with said rear end portion of the pin shank 13 and extends across and is connected with the adjacent face of the said flat rigid member 12.

The casing 11 is shown consisting of front and back layers 11a and 11b which are secured together along their edges by the stitches 15. These layers are of cloth material. The flat rigid member 12 is in the nature of a piece of cardboard or sheet metal, or other material. The support sheet 14 is in the nature of a piece of paper, or cardboard, or similar material. Reference numeral 16 indicates the adhesive material which secures together the support sheet 14 and the flat rigid member 12 and the rear end portion of the pin shank 13.

The adhesive material 16 may be a glue, cement, paste and the like. The adhesive material 16 may initially be coated on the support sheet 14, or coated on the rigid member 12, or may be applied when needed to one or the other of these parts. Preferably, the support sheet 14 and adhesive material 16 is in the nature of gummed paper. This gummed paper may come in sheets, or rolls and may be cut up into small pieces as needed to engage against the face of the flat rigid member 12.

It should be noted that the support sheet 14 is fashioned to follow the contour of the rear end portion of the pin shank 13. Thus fashioned it forms a better bond with the pin shank 13. It may be fashioned in this manner with one's finger nails when applied, or with the use of a die, such as illustrated in Figs. 4 and 5. The die has a base section 17 and a head 18 between which the flat rigid member 12 and support sheet 14 with adhesive 16 on one face are engaged. The base section 17 is formed with a groove 19 along which the pin shank 13 may extend. When the die is closed the support sheet 14 will be fashioned or formed. When a die is used the support sheet and rigid flat member are laminated under pressure. The bond between the adhesive 16 and the pin shank 13 may be increased by roughening or knurling the rear end of the pin shank 13.

In Figs. 6 and 7 a modified form of the invention has been disclosed in which the connected flat rigid member 20 and pin shank 21 are joined in another way. The rear end portion of the pin shank 21 is formed with a head 22, either from the material of the pin shank or from foreign substances such as a bead of glass. The pin shank 21 is forced through an edge and across the body of the flat rigid member 20. Thus the flat rigid member 20 and pin shank 21 are frictionally connected. If desired, adhesive may be applied on the rear end portion of the pin shank 21 so that it adhesively engages and holds the flat rigid member 20. One edge of the flat rigid member 20 is formed with a notch 23 into which the head 22 engages.

In Figs. 8 and 9 still another form of connected flat rigid member and pin shank is shown. In this form there is a flat rigid member 24 formed with a pair of openings 25, 26. The rear end portion of the pin shank 27 is laced through these openings 25 and 26, and then the parts are pressed together in a suitable die so that the rear end portion of the pin shank 27 and the flat rigid member 24 bent slightly relative to each other, locking each other in position. This may be clearly seen from an inspection of Fig. 9. Moreover, adhesive may be added between the contacting parts of the pin shank 27 and the flat rigid member 24.

In Figs. 10 to 12 still another form of the invention is disclosed in which the flat rigid member 28 is in the nature of a piece of flat rigid sheet material bent at the center 29 so as to have adjacent layers 30 and 31. There is an opening 32 at the bent portion 29 through which the pin shank 33 passes. The adjacent faces of the layers 30 and 31 are provided with adhesive 34 which adhesively connect the adjacent faces of the layers, and connect the contacting portions of the layers with the rear end portion of the pin shank.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A hat pin, and the like having a head which includes a cloth casing and a flat rigid member within and supporting said casing, a pin shank having its rear end portion extending into said casing and along one face of said rigid flat member, and a support sheet extending across and adhesively connected with said rear end portion of said pin shank and extending across and adhesively connected with one face of said flat rigid member.

2. A hat pin, and the like having a head which includes a cloth casing and a flat rigid member within and supporting said casing, a pin shank having its rear end portion extending into said casing and along one face of said rigid flat member, and a support sheet extending across and adhesively connected with said rear end portion of said pin shank and extending across and adhesively connected with one face of said flat rigid member, said support sheet being flexible.

3. A hat pin, and the like having a head which includes a cloth casing and a flat rigid member within and supporting said casing, a pin shank having its rear end portion extending into said casing and along one face of said rigid flat member, and a support sheet extending across and adhesively connected with said rear end portion of said pin shank and extending across and adhesively connected with one face of said flat rigid member, said support sheet being fashioned to follow the contour of the rear end portion of the pin shank.

4. A hat pin, and the like, having a head which includes a cloth casing and a flat rigid member within and supporting said casing, a pin shank having its rear end portion extending into said casing and along one face of said rigid flat member, and a support sheet extending across and adhesively connected with said rear end portion of said pin shank and extending across and adhesively connected with one face of said flat rigid member, said support sheet being a paper sheet.

5. A hat pin, and the like having a head which includes a cloth casing and a flat rigid member within and supporting said casing, a pin shank having its rear end portion extending into said casing and along one face of said rigid flat member, and a support sheet extending across and adhesively connected with said rear end portion of said pin shank and extending across and adhesively connected with one face of said flat rigid member, said flat rigid member being a cardboard or the like sheet.

6. A hat pin, and the like having a head which includes a cloth casing and a flat rigid member within and supporting said casing, a pin shank having its rear end portion extending into said casing and along one face of said rigid flat member, and a support sheet extending across and adhesively connected with said rear end portion of said pin shank and extending across and adhesively connected with one face of said flat rigid member, said adhesive connection being obtained with an applied adhesive, or the like.

7. A hat pin, and the like having a head which includes a cloth casing and a flat rigid member within and supporting said casing, a pin shank having its rear end portion extending into said casing and along one face of said rigid flat member, and a support sheet extending across and adhesively connected with said rear end portion of said pin shank and extending across and adhesively connected with one face of said flat rigid member, said support sheet and flat rigid member being laminated under pressure.

8. A connected flat rigid member and pin shank for a hat pin of the class described, comprising a flat rigid member, a pin shank having its rear end portion extending along one face of said flat rigid member, and a support sheet extending across and adhesively connected with said rear end portion of said pin shank and extending across and adhesively connected with one face of said flat rigid member.

JACK I. ELLERSTEIN.